(12) United States Patent
Woud

(10) Patent No.: US 7,859,222 B2
(45) Date of Patent: Dec. 28, 2010

(54) CASE BATTERY SYSTEM

(76) Inventor: Steven Woud, 11411 Ohio Ave., Apt. #12, Los Angeles, CA (US) 90025

(*) Notice: Subject to any disclaimer, the term of this patent is extended or adjusted under 35 U.S.C. 154(b) by 527 days.

(21) Appl. No.: 12/016,685

(22) Filed: Jan. 18, 2008

(65) Prior Publication Data

US 2009/0160400 A1 Jun. 25, 2009

Related U.S. Application Data

(63) Continuation-in-part of application No. 11/963,692, filed on Dec. 21, 2007.

(51) Int. Cl.
*H02J 7/00* (2006.01)
(52) U.S. Cl. .................. 320/115; 320/113; 455/90.3; 455/575.1
(58) Field of Classification Search ............ 320/115, 320/103, 106, 114, 107; 49/142, 163
See application file for complete search history.

(56) References Cited

U.S. PATENT DOCUMENTS

| | | | | |
|---|---|---|---|---|
| 5,465,038 | A * | 11/1995 | Register | 710/1 |
| 5,828,966 | A * | 10/1998 | Davis et al. | 455/573 |
| 5,946,637 | A * | 8/1999 | Umbach et al. | 455/573 |
| 5,973,677 | A * | 10/1999 | Gibbons | 345/179 |
| 6,619,982 | B2 * | 9/2003 | Tamura | 439/534 |
| 6,696,922 | B1 * | 2/2004 | Wong et al. | 340/7.32 |
| 6,891,351 | B2 * | 5/2005 | Chen | 320/115 |
| 2002/0079864 | A1 * | 6/2002 | Soumi et al. | 320/115 |
| 2002/0107043 | A1 * | 8/2002 | Adamson et al. | 455/550 |
| 2003/0025674 | A1 * | 2/2003 | Watanabe | 345/168 |
| 2005/0255895 | A1 * | 11/2005 | Lee et al. | 455/573 |
| 2006/0125445 | A1 * | 6/2006 | Cao et al. | 320/112 |
| 2007/0099681 | A1 * | 5/2007 | Kielland | 455/575.1 |
| 2007/0152633 | A1 * | 7/2007 | Lee | 320/114 |
| 2007/0293281 | A1 * | 12/2007 | Nogueiras et al. | 455/575.1 |
| 2008/0007214 | A1 * | 1/2008 | Cheng | 320/114 |
| 2008/0019082 | A1 * | 1/2008 | Krieger et al. | 361/679 |
| 2008/0067977 | A1 * | 3/2008 | Lee et al. | 320/115 |
| 2008/0119244 | A1 * | 5/2008 | Malhotra | 455/575.1 |
| 2008/0224660 | A1 * | 9/2008 | Lin et al. | 320/115 |
| 2009/0015192 | A1 * | 1/2009 | Sheu | 320/103 |
| 2009/0036174 | A1 * | 2/2009 | Brandenburg et al. | 455/575.1 |
| 2009/0096417 | A1 * | 4/2009 | Idzik et al. | 320/115 |
| 2009/0121680 | A1 * | 5/2009 | Kikuchi | 320/115 |

* cited by examiner

*Primary Examiner*—Edward Tso
*Assistant Examiner*—Arun Williams
(74) *Attorney, Agent, or Firm*—John K. Park; Park Law Firm

(57) ABSTRACT

A case battery system is provided. The case battery system comprises the case battery, the connector adaptor and the dock. The case battery configured to enclose and hold at least part of a personal electronic device. The personal electronic device may be connected to the connector adaptor, or installed on the dock to be charged or communicate among themselves and with other electronic devices. The top holding portion is configured to hold the top and partial lateral part of the personal electronic device with holes. The rear plate portion comprises the charging portion and the first circuit portion, or the rear plate portion can be a regular plate without the charging portion and the first circuit portion. The top holding portion, the rear plate portion and the bottom holding portion can be assembled sliding the longitudinal rails to the longitudinal rail recesses to enclose a personal electronic device.

16 Claims, 20 Drawing Sheets

CASE BATTERY SYSTEM

RELATED APPLICATION

This application is a continuation-in-part of U.S. patent application Ser. No. 11/963,692 for "Case Battery" filed on Dec. 21, 2007.

BACKGROUND OF THE INVENTION

The present invention relates to a case battery system which extends the usage time of a personal electronic device. More particularly, this invention relates to a case battery with storage that provides more electrical power and protection of a personal electronic device. Furthermore, the present invention provides the case battery an ability to be engaged on the dock even when a personal electronic device is placed in it so as to be charged and communicate between a personal electronic device and components of the case battery system, an external electronic device.

"Portable" is one of the keywords which defines the era of information technology. Computing power had been an obstacle to making the technology portable for a long time. Considering the first computer, it would be easy to understand the situation. With the advent of the transistors and integrated circuit, however, computing power can be crammed in a really small space. Locating the heart of a computer inside the computer or even on a mother board is not easy, actually challenging to a layman. Once the computing power became possible for portability, it took a very short time to recognize the hard fact that the power source of a battery and the memory capacity are the serious problems. This is much harder to solve than the CPU problem.

Since the 1990's, portable electronic devices such as cellular phones, MP3 players, camcorders, digital cameras, etc., have become indispensable to every one. The portable electronic devices need to be charged very frequently such that the usage is critically limited.

Also, because functions of portable electronic devices are limited, a variety of convenient supplementary functions are in demand to fulfil users' needs.

Accordingly, a need for a case battery system for a personal electronic device or a portable personal electronic device has been present for a long time. This invention is directed to solve these problems and satisfy the long-felt need.

SUMMARY OF THE INVENTION

The present invention solves the disadvantages of the prior art.

An objective of the invention is to provide a case battery system for a personal electronic device. The case battery system includes a case battery, a connector adaptor, and a dock.

Another objective of the invention is to provide a case battery for a personal electronic device which can extend the usage time of the personal electronic device.

Still another objective of the invention is to provide a case battery for a personal electronic device which provides a connector adaptor and a dock for charging the personal electronic device and a battery in the case battery. Also, the connector adaptor and the dock may provide a connection to other electronic device such as computer or cellphone.

The invention provides a case battery for a personal electronic device. The case battery includes a bottom holding portion, a rear plate portion, a top holding portion.

The bottom holding portion is configured to hold the lower part of the personal electronic device and provide a plurality of external interfacing devices with access to the personal electronic device.

The rear plate portion is configured to be attached to or detached from the bottom holding portion mechanically and electrically, and protect the rear portion of the personal electronic device.

The top holding portion is configured to hold the top part of the personal electronic device and provide access holes to at least part of the input and output devices of the personal electronic device.

The charging portion is disposed in the rear plate portion, and configured to be electrically connected to the personal electronic device while the personal electronic device is installed in the case battery.

The circuit portion is disposed in the rear plate portion, and configured to connect the charging portion to the personal electronic device.

The bottom holding portion may include a first connector, a plurality of holes, and a plurality of resonance chambers.

The first connector may be configured to electrically connect the case battery to the personal electronic device, and include a power connector and a electrical signal connector.

The plurality of holes may be configured to pass sound from speakers of the personal electrical device and speaker of the case battery, and disposed on a front side or a corner between the front and rear sides of the bottom holding portion.

The plurality of resonance chambers may be provided between the speakers and the plurality of holes, and configured to resonate the sound from the speaker.

The bottom holding portion may engage the side edges of the personal electronic device and expose a substantial part of a display screen of the personal electronic device.

The bottom holding portion may further comprise a first mechanical fastener, and the rear plate portion may comprise a second mechanical fastener corresponding to the first mechanical fastener. The bottom holding portion and the rear plate portion may be attached and locked to each other by the first and second mechanical fasteners.

The charging portion may further includes a secondary battery and be configured to be charged using an external electrical power source, or a primary battery and a receptacle configured to accept the primary battery.

The circuit portions of the case battery system may be configured to control behaviors of the case battery, the connector adaptor and the dock.

The connector adaptor may be configured to be attached to or detached from the bottom holding portion, and includes a plurality of locks configured to lock the connector adapter to the bottom holding portion, a release button configured to release the connector adaptor from the bottom holding portion, and a multi-purpose receptacle.

The first connector of the bottom holding portion may be configured to be connected to the multi-purpose receptacle of the connector adaptor which may accept a multi-purpose connector from an external electronic device. The circuit portion of the connector adaptor may be configured to communicate between other components of the battery system, a personal electronic device and a external electronic device.

The dock may be configured to accept the bottom holding portion of the case battery which encloses a personal electronic device. The dock may provide access to external electrical power to charge the charging portion. The circuit portion of the dock is configured to control the behavior of the dock and communications between other components of the case battery, a personal electronic device and an external electronic device.

The dock may include a holding cup, a plurality of spring connectors, a plurality of locks, a plurality of holes, plurality of release buttons, a multi-purpose receptacle, a FM/AM radio, antennae, a plurality of controllers, a plurality of displays, a charging indicator, a plurality of speakers, a microphone, an optical sensor and an inactivation off switch.

The holding cup may be configured to accept and engage at least part of the bottom holding portion.

The spring connectors may be configured to connect the connector receptacle plates of the bottom holding portion when disposed at a bottom of the holding cup. The spring connector of the dock may be configured to be connected to the multi-purpose receptacle of the dock which further connects to an external electronic device via a USB connector or other types of connectors.

The plurality of locks may be configured to lock the bottom holding portion in place.

The release button may be configured to release the bottom holding portion from the plurality of locks.

The connector receptacle plates may be configured to electrically connect the first connector to an external device.

The multi-purpose connector receptacle may be configured to accept a multi-purpose connector from the external electronic device.

The charging indicator may be configured to monitor the charging status of the charging portion and the battery of the personal electronic device.

The rear plate portion including charging and circuit portion may be replaceable, and the rear plate portion may have a predetermined thickness according to a capacity of the charging portion and the complexity of the first circuit portion. Then the holding cup may be adjustable or replaceable according to the various thickness and size of the case battery.

The bottom holding portion may further include case battery speakers connected to the personal electronic device and an deactivation switch. The dock may further include a bump configured to press the deactivation switch when the bottom holding portion is installed on the dock so as to deactivate the case battery speakers.

The top holding portion may include a third mechanical fastener, and the rear plate portion may include a fourth mechanical fastener corresponding to the third mechanical fastener. The top holding portion and the rear plate portion may be attached and locked to each other by the third and fourth mechanical fasteners.

The case battery may further include a connector adaptor configured to be attached to or detached from the bottom holding portion, and the connector adaptor may comprise a plurality of locks configured to lock the connector adapter to the bottom holding portion, a release button configured to release the connector adaptor from the bottom holding portion, and a multi-purpose receptacle. The bottom holding portion may further comprise a guide recess and a locking recess at a lower part such that the connector adapter is guided to be fitted exactly to the bottom holding portion in order to connect the connector receptacle plates and the spring connectors.

The connector adaptor may include a charging status of the charging portion and the battery of the electronic device.

The personal electronic device may comprise a portable game machine, a cellular phone, a PDA, a palmtop, a MP3 player, a camcorder, a digital camera or a GPS.

The advantages of the present invention are: (1) the case battery can extend the usage time of the personal electronic device; and (2) the case battery and the personal electronic device can simultaneously be charged and connected to an external electronic device conveniently when the case battery enclosing a personal electronic devise is attacked to the connector adaptor or is disposed on the dock; (3) the circuit portions of the case battery are minimised because the circuit portions of the connector adaptor or the dock are configured to control some of the function of the circuit portion of the case battery, thus making the case battery more light and compact.

Although the present invention is briefly summarized, a fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
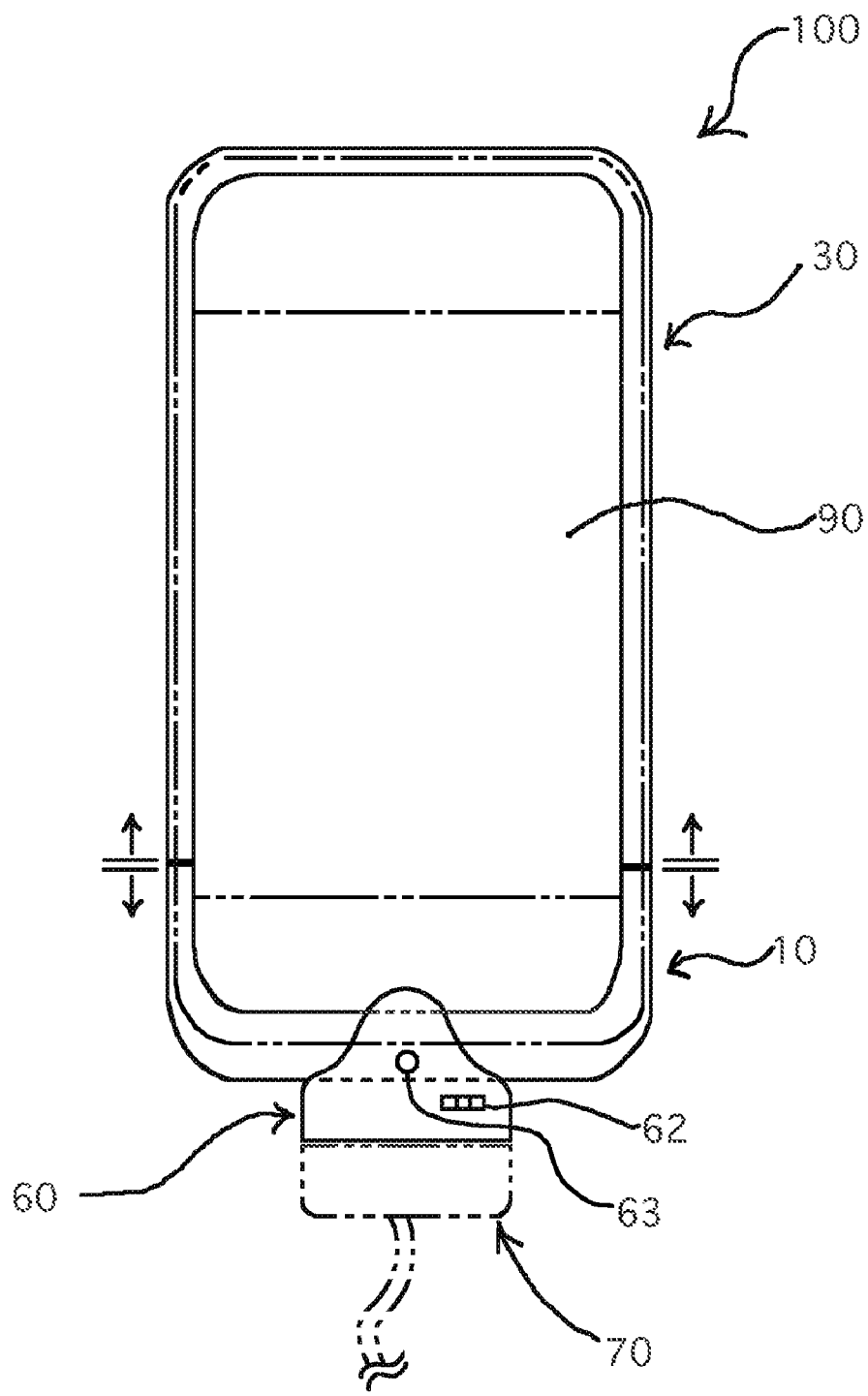
FIG. 1 is a front plan view showing the case battery installed on a personal electronic device, and the connector adaptor is attached to the bottom of the holding portion, according to an embodiment of the present invention.

FIGS. 1-20 illustrate a case battery 100 installed on a personal electronic device 90, a connector adaptor 60, and the dock 80 according to embodiments of the present invention.

An aspect of the invention provides a case battery system for a personal electronic device 90. The case battery system includes a case battery 100, the connector adaptor 60 and the dock 80.

The case battery 100 includes a bottom holding portion 10, a rear plate portion 20, a top holding portion 30.

In certain embodiments, all or some part of the case battery 100 may be transparent so the personal electronic device is seen through the of the case battery.

The bottom holding portion 10 is configured to hold a lower part of the personal electronic device 90 and provide a plurality of external interfacing devices with access to the personal electronic device 90.

The rear plate portion 20 is configured to be attached to or detached from the bottom holding portion 10 mechanically and electrically and protect the rear portion of the personal electronic device 90, and the rear plate portion 20 is also configured to be attached to or detached from the top holding portion 30 mechanically. The top holding portion 30 also configured to be attached to or detached from the bottom holding portion 10.

As shown in FIGS. 2, 3, 4, 5, 6 and 9, The top holding portion 30 is configured to hold and protect the top and partial lateral side of the personal electronic device 90 and provide access holes to at least part of input and output devices of the personal electronic device 90. The top holding portion 30 may comprise a plurality of holes 32 to access the personal electronic device 90.

Figure 5:
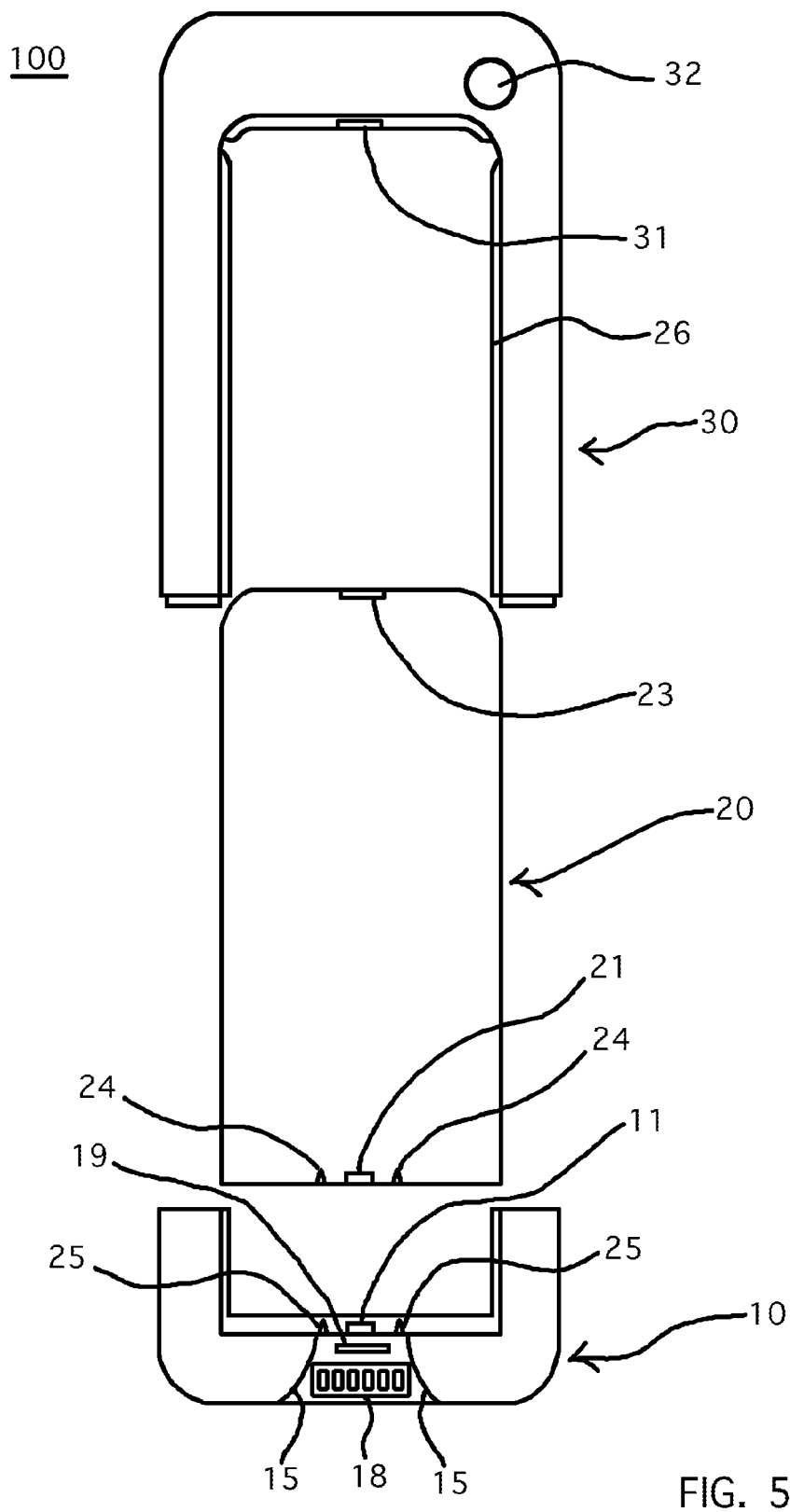
FIG. 5 is a rear plan view of an exploded case battery according to an embodiment of the present invention.
Figure 6:
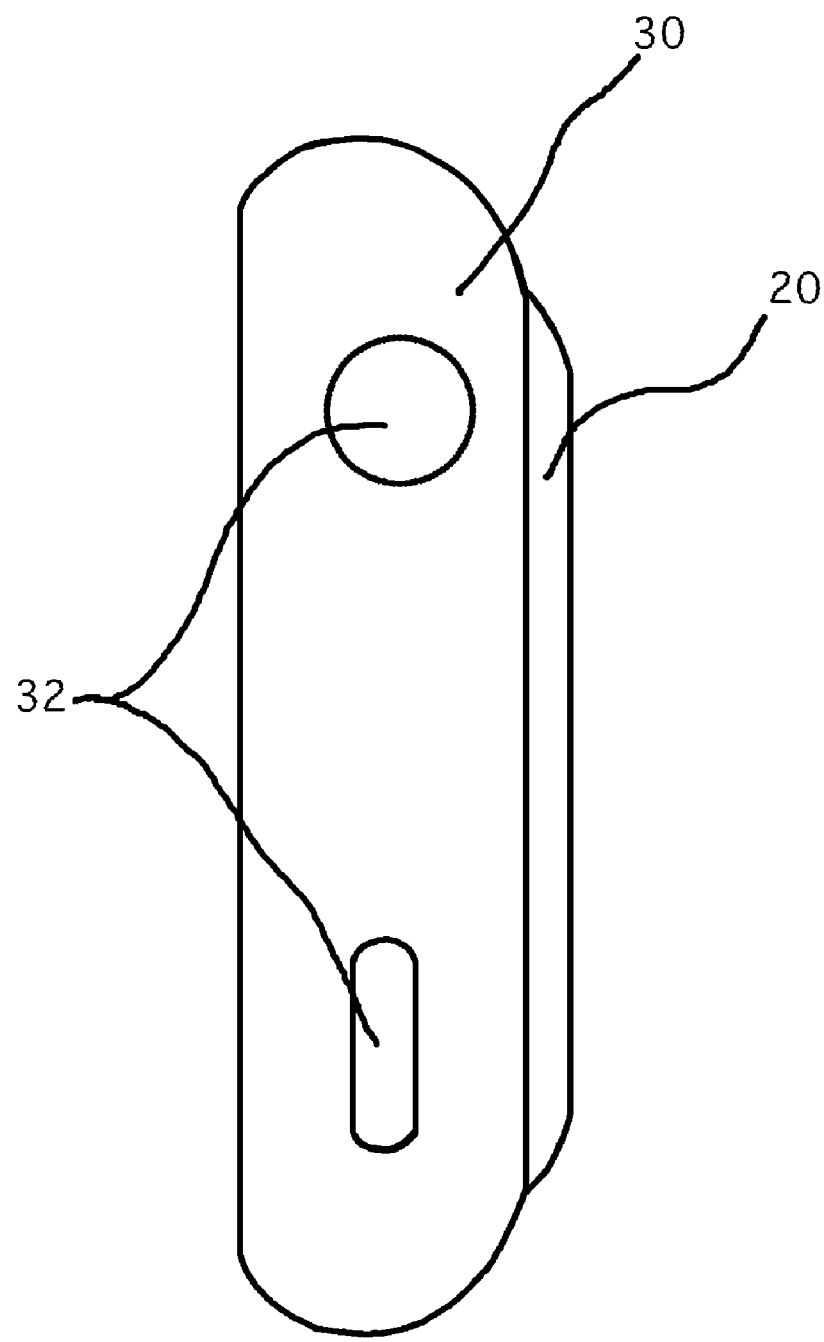
FIG. 6 is a top plan view of the case battery according to an embodiment of the present invention.

As shown in FIG. 5, the top holding portion 30 may include a third mechanical fastener 31, and the rear plate portion 20 may include a fourth mechanical fastener 23 corresponding to the third mechanical fastener 31. The top holding portion 30 and the rear plate portion 20 may be attached and locked to each other by the third and fourth mechanical fasteners 31 and 23.

Figure 10:
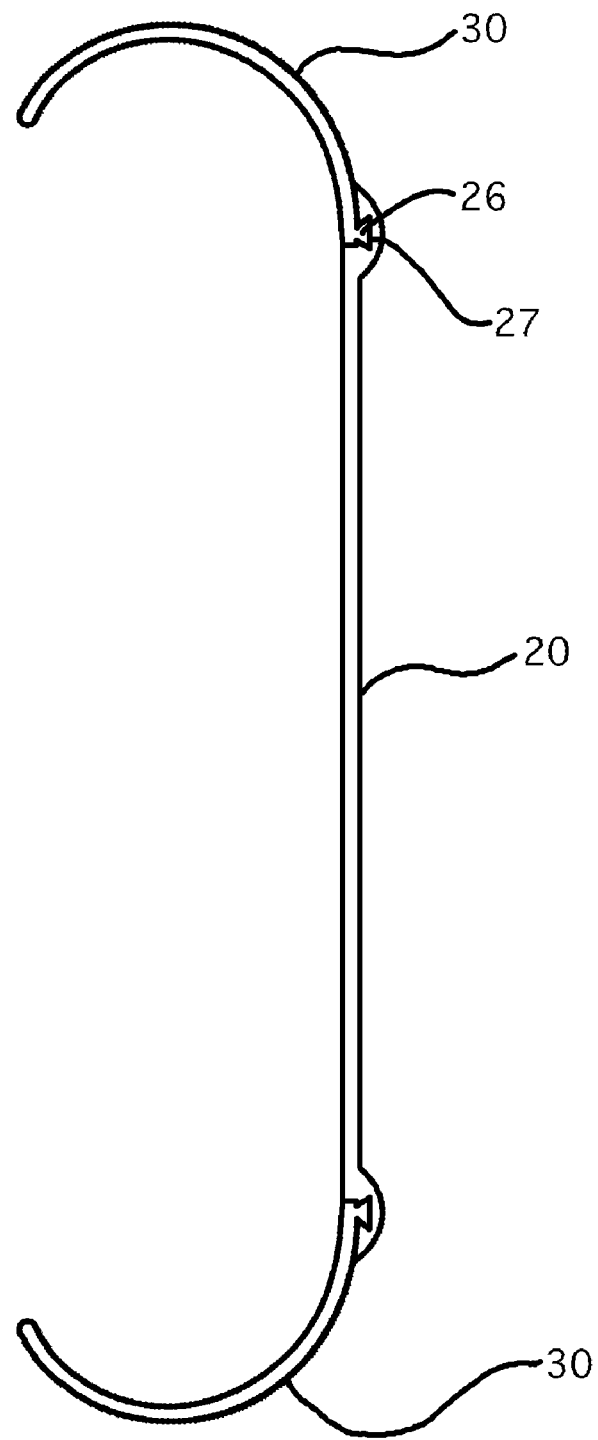
FIG. 10 is a side cross-sectional view of the case battery with a regular rear plate portion without a charging portion and first circuit portion installed according to an embodiment of the present invention.
Figure 11:
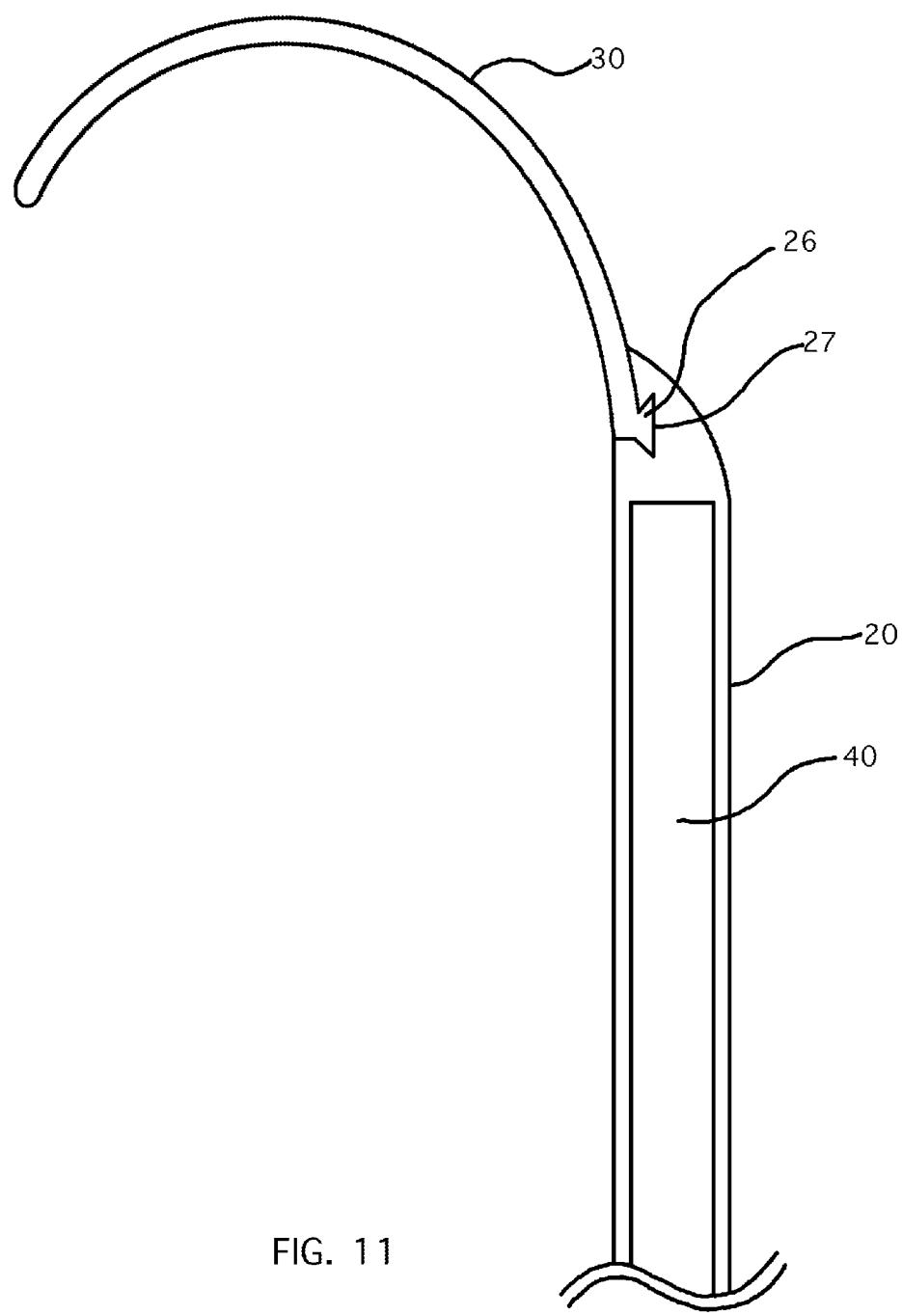
FIG. 11 is a partial side cross-sectional view of the case battery with a rear plate portion with the first charging portion installed, and the longitudinal rail of the top holding portion engaged in the longitudinal rail recess of the rear plate portion according to an embodiment of the present invention.
Figure 12:
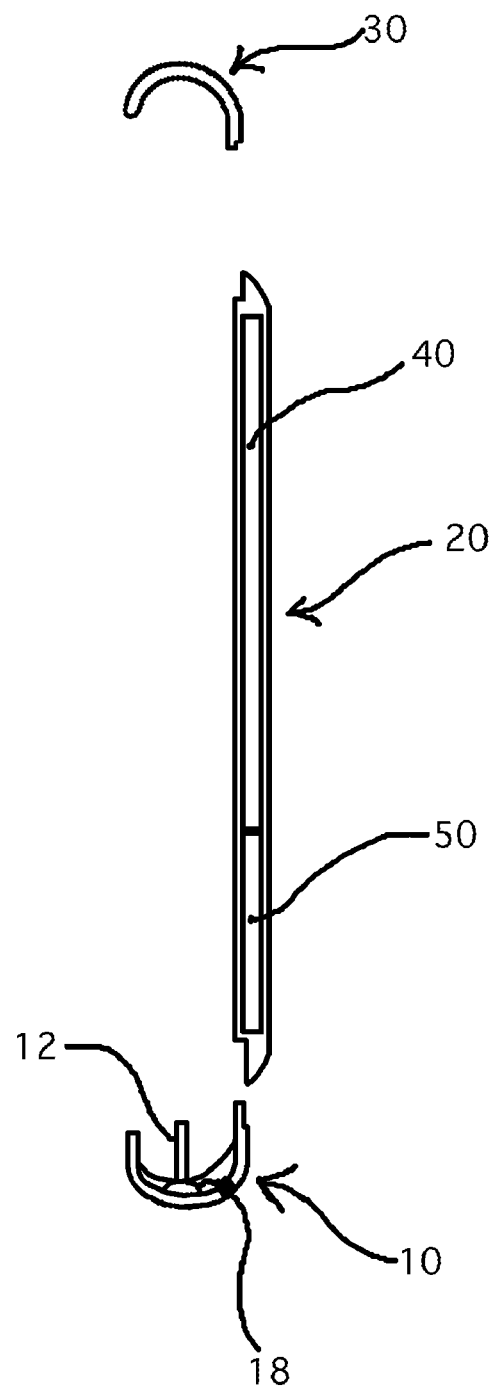
FIG. 12 a side cross-sectional view of the case battery with the rear plate portion with the charging portion installed according to an embodiment of the present invention.

In certain embodiments, the rear plate 20 and sides of the top or bottom holding portion 30, 10 can be connected by one or more longitudinal rails 26 and longitudinal rail recesses 27 as shown in FIG. 10.

Figure 4:
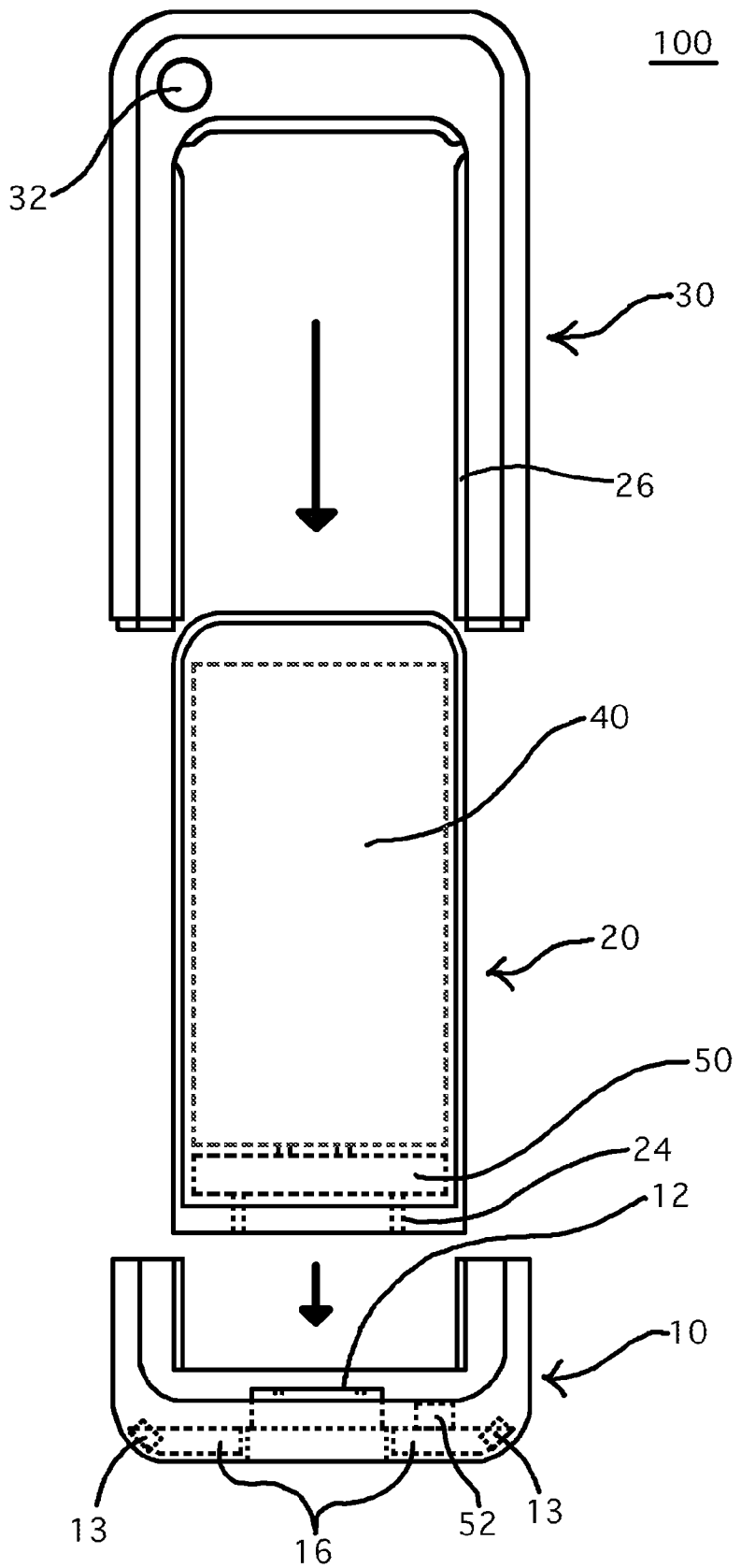
FIG. 4 is still another front plan view of an exploded case battery according to still another embodiment of the present invention showing the resonance chambers, the speakers and second circuit portion embedded inside of the bottom holding portion, and also showing the charging portion and the first circuit portion embedded inside of the rear plate portion.

As shown in FIG. 4, the charging portion 40 and the first circuit portion 50 are disposed in the rear plate portion 20, and configured to be electrically connected to the personal electronic device 90 while the personal electronic device 90 is installed in the case battery 100.

The circuit portion 50 is disposed in the rear plate portion 20, and configured to connect the charging portion 40 to the personal electronic device 90.

As shown in FIG. 4, in certain embodiments of the invention, a part of or the entire first circuit portion 50 of the rear plate portion 20 may be disposed in the second circuit portion 52 of the bottom holding portion 10, and the disposition may be reversed. Also, the disposition of the charging portion 40 and the circuit portion 50 may be switched within the rear plate portion 20. The rear plate portion 20 may be thinner or smaller by moving a part of circuit portion 50 to the bottom holding portion 10, the connector adaptor 60 or the dock.

The bottom holding portion 10 may include a first connector 12, a plurality of holes 14, and a plurality of resonance chambers 16.

The first connector 12 may be configured to electrically connect the case battery 100 to the personal electronic device 90 including electrical power and communication signals.

Figure 2:
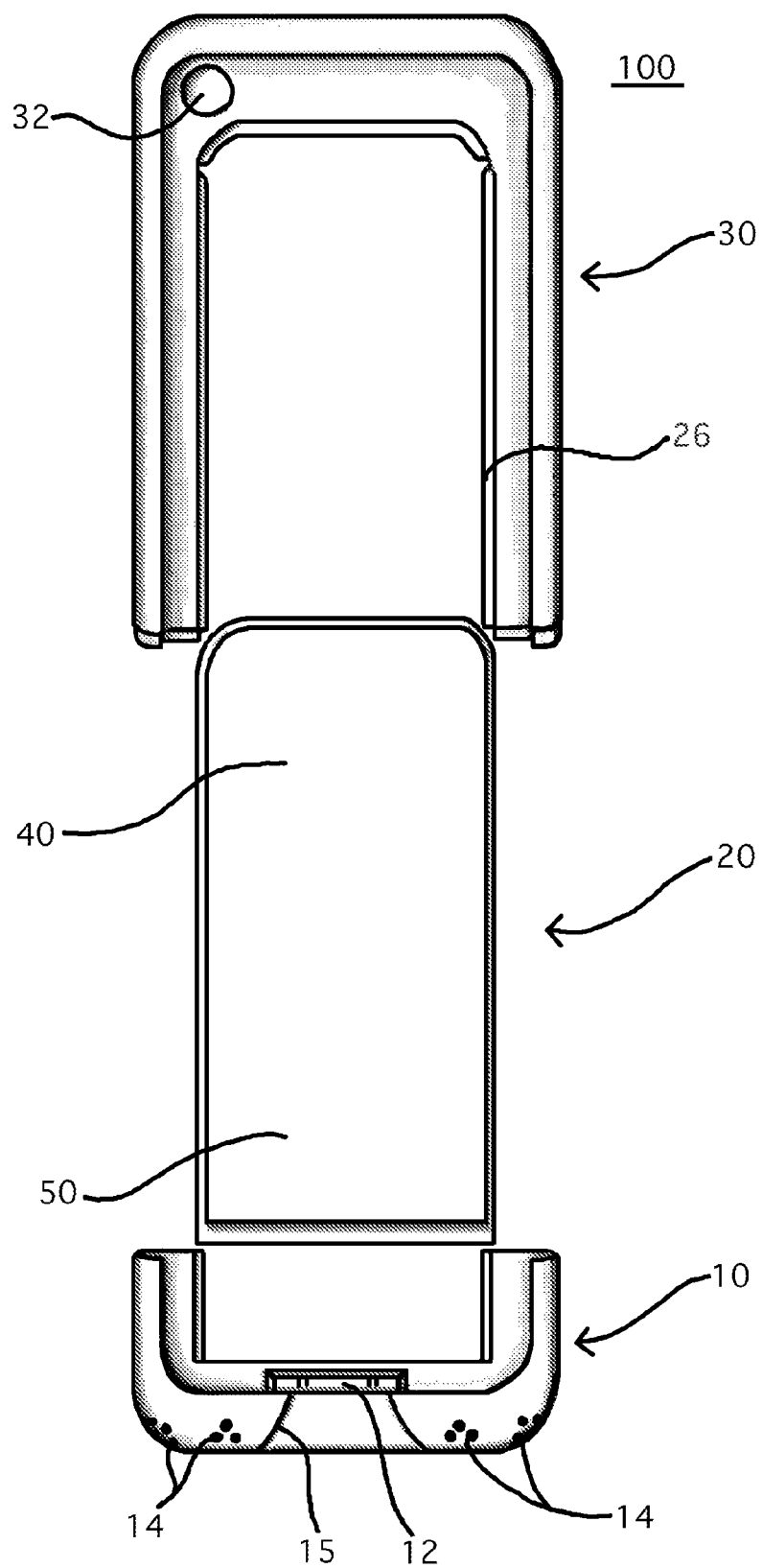
FIG. 2 is a front plan view of an exploded case battery according to an embodiment of the present invention.

As shown in FIG. 2, the plurality of holes 14 may be configured to pass sound from a speaker of the personal electrical device 90, and may be disposed on the front side, the bottom side or a corner between the front and rear sides of the bottom holding portion 10.

Figure 3:
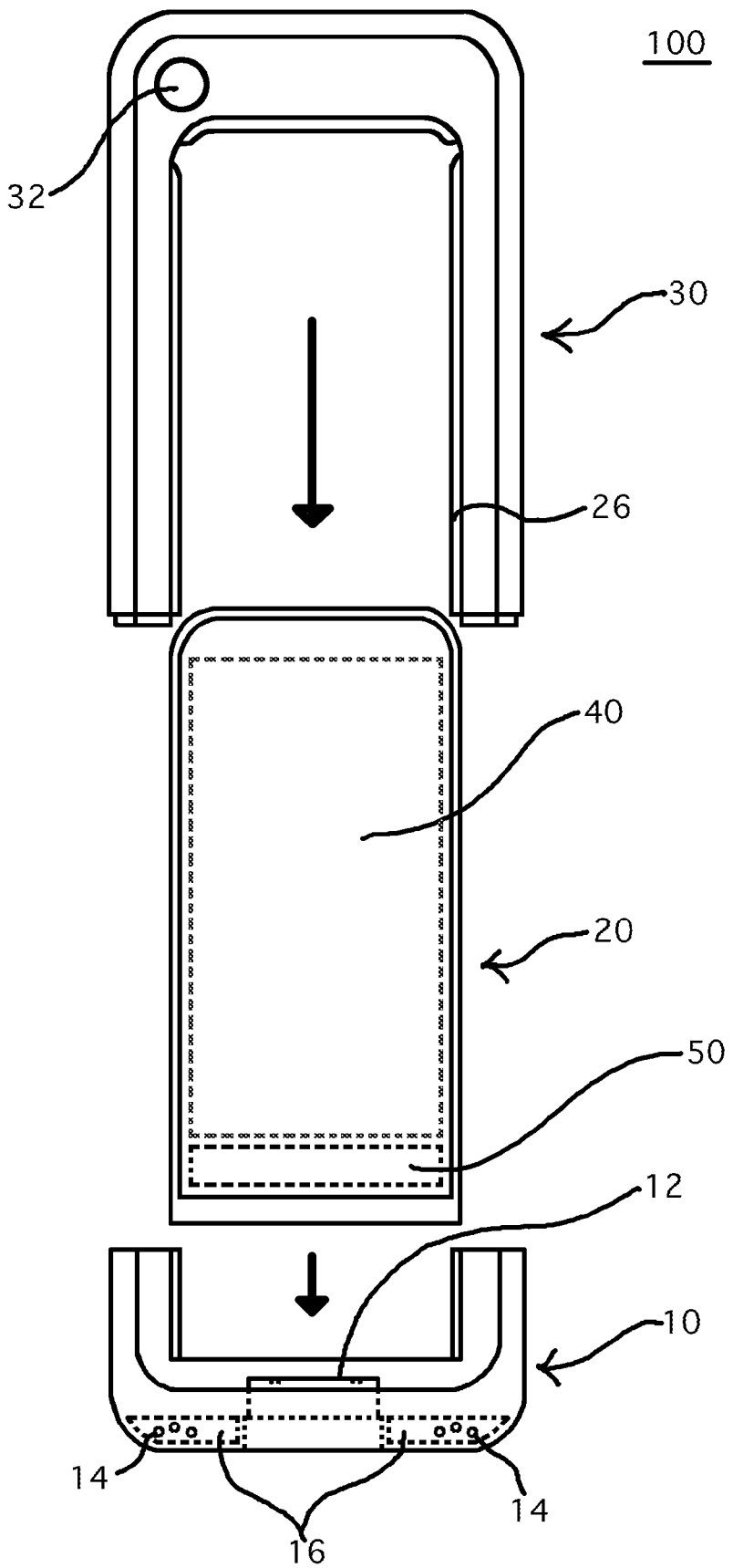
FIG. 3 is another front plan view of an exploded case battery according to another embodiment of the present invention showing the resonance chambers embedded inside of the bottom holding portion.

As shown in FIGS. 3 and 4, the plurality of resonance chambers 16 may be disposed between the speakers of the personal electronic device 90 and the plurality of holes 14, and configured to make the sound from the case battery speaker 13 or the personal electronic device 90 resonate. That is, the resonance chambers 16 are located to make the sound from the personal electronic device 90 enter therein and resonate, and also the case battery speaker 13 is disposed so as to issue the sound into the resonance chambers 16 to be resonated. The sound can be amplified acoustically by the resonance chambers 16.

The bottom holding portion 10 may engage the side edges of a personal electronic device 90 and exposes the display screen of the personal electronic device 90.

As shown in FIG. 5, the bottom holding portion 10 may further comprise a first mechanical fastener 11, and the rear plate portion 20 may comprise a second mechanical fastener 21 corresponding to the first mechanical fastener 11. The bottom holding portion 10 and the rear plate portion 20 may be attached and locked to each other by the first and second mechanical fasteners 11, 21. The rear plate portion 20 and the bottom holding portion 10 may be electrically connected to each other through a plurality of electrical connectors 24, 25.

Figure 7:
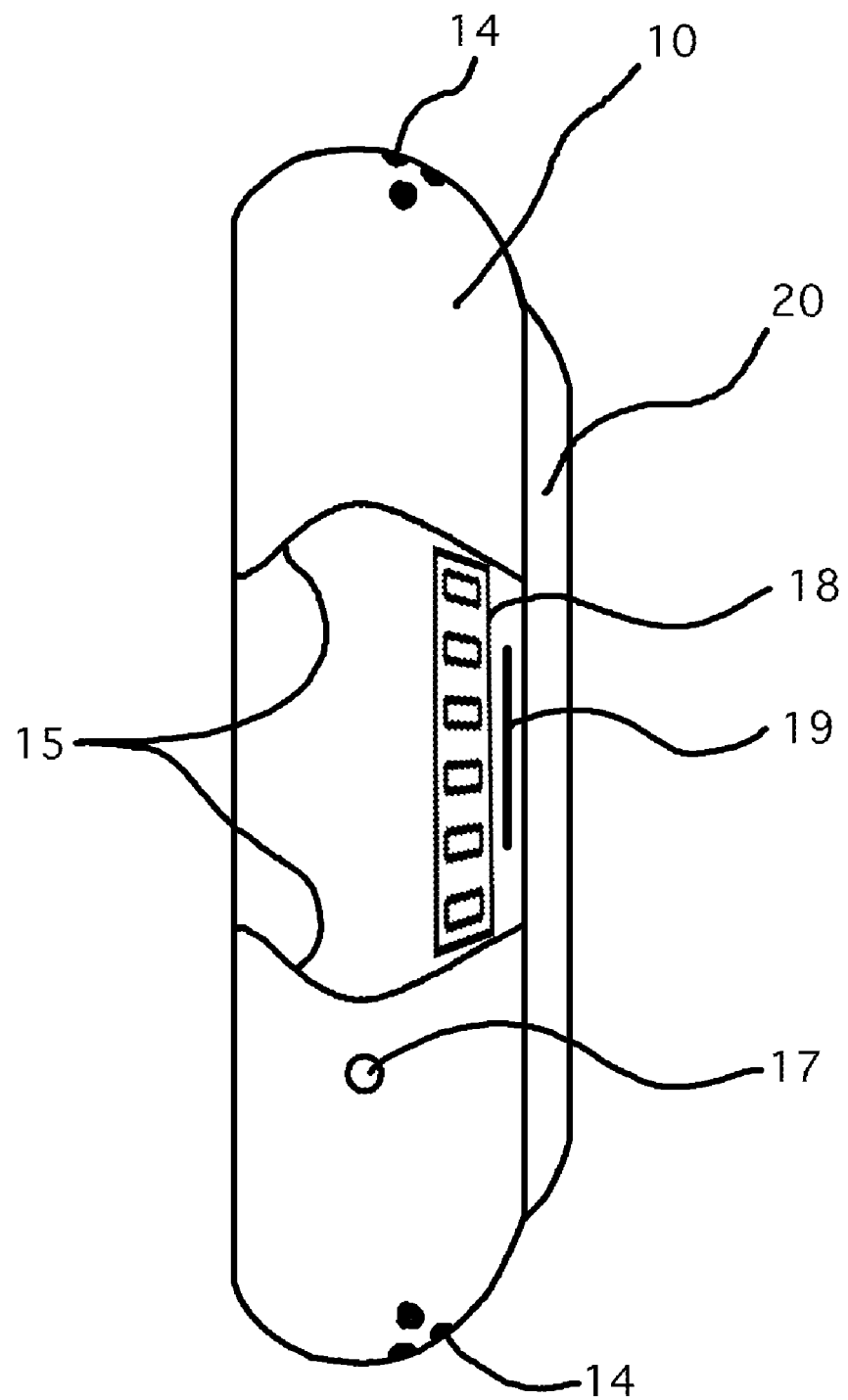
FIG. 7 is a bottom plan view of the case battery according to an embodiment of the present invention.
Figure 8:
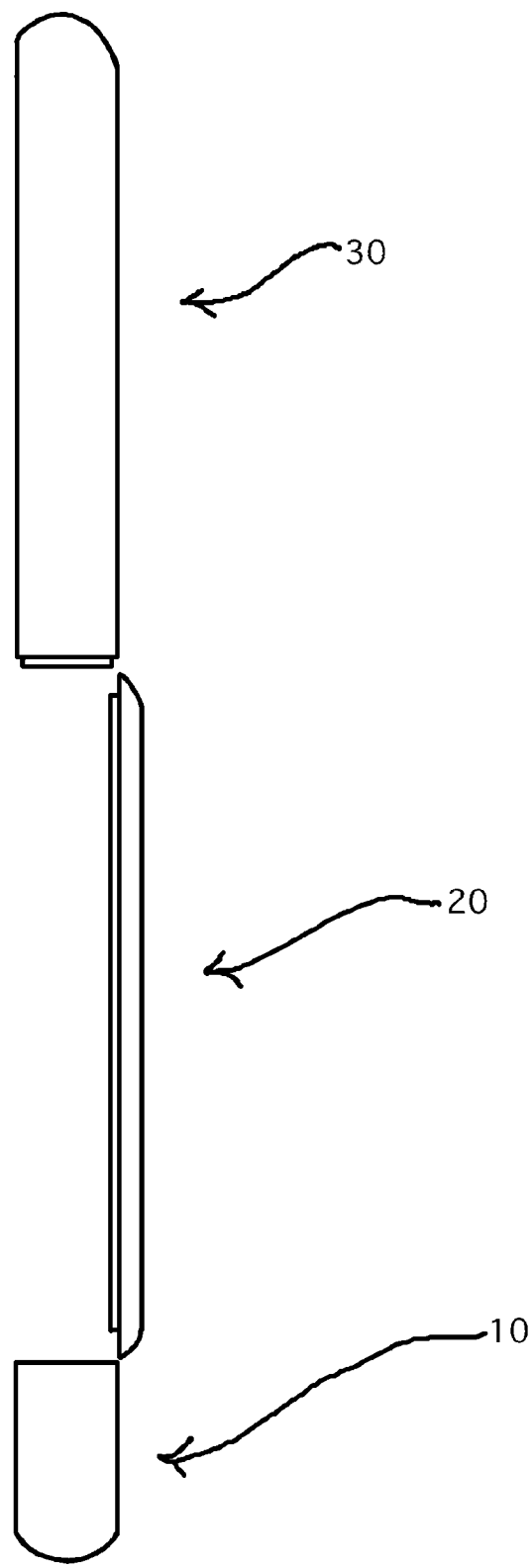
FIG. 8 is a side plan view of the exploded case battery according to an embodiment of the present invention.
Figure 9:
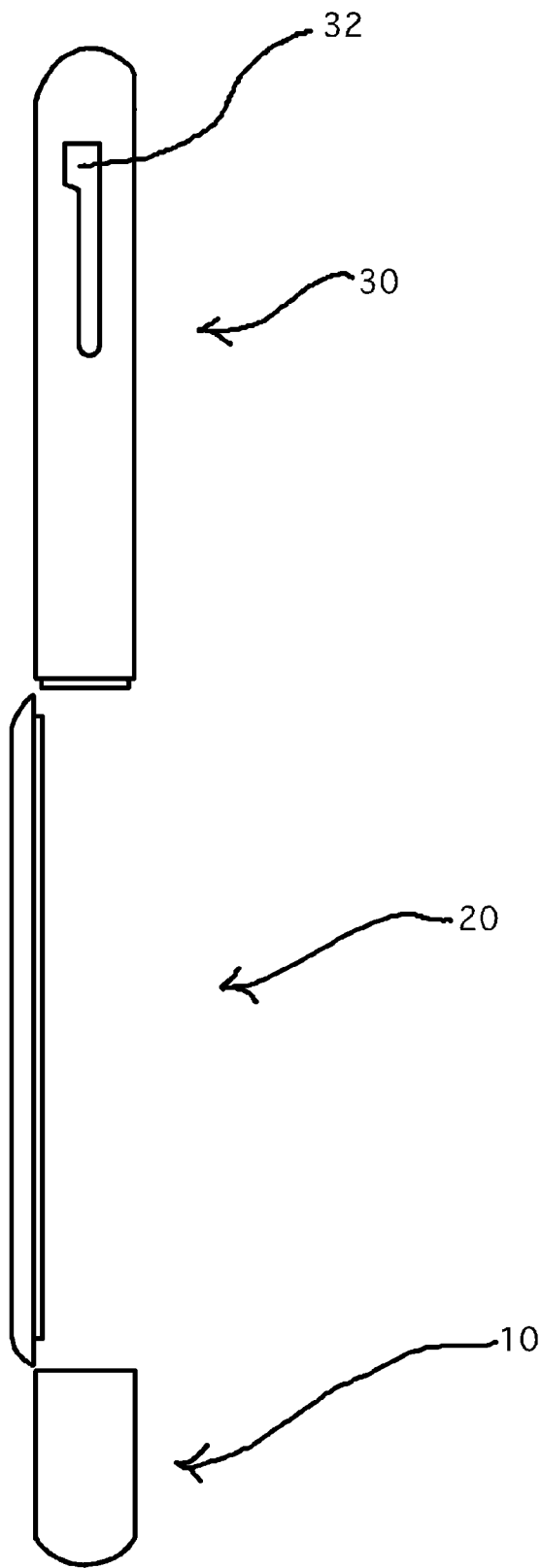
FIG. 9 is another side plan view of the exploded case battery according to an embodiment of the present invention.

As shown in FIGS. 2, 5 and 7, the bottom holding portion 10 may further comprise a guide recess 15 and a locking recess 19 at a lower part such that the connector adapter 60 is guided to be connected to the bottom holding portion 10.

The charging portion 40 may further include a secondary battery and configured to be charged using an external electrical power source, or a primary battery and a receptacle configured to accept the primary battery.

As shown in FIG. 4, 13, 14, 18 or 19, the first, second, third or fourth circuit portion 50, 52, 64 or 182 may be configured to control behaviors of the charging portion 40 and a personal electronic device 90. The behaviors may comprise activating, deactivating, charging, and discharging. The first, second, third and fourth circuit portion 50, 52, 64 and 182 also may be configured to control behaviors of the case battery speakers 13, the communication between a personal electronic device 90, the case battery 100, and the connector adaptor 60 or the dock 80.

Figure 13:
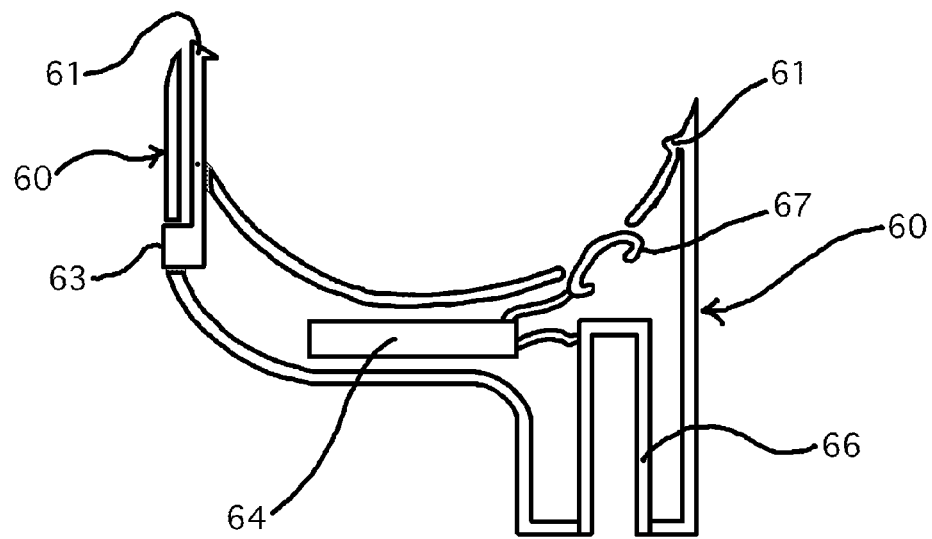
FIG. 13 is a side cross-sectional view of the connector adaptor according to an embodiment of the present invention.

As shown in FIG. 13, the connector adaptor 60 may be configured to be attached to or detached from the bottom holding portion 10, and include a plurality of locks 61 configured to lock the connector adapter 60 to the bottom holding portion 10, a release button 63 configured to release the connector adaptor 60 from the bottom holding portion 10, and a multi-purpose receptacle 66.

Figure 14:
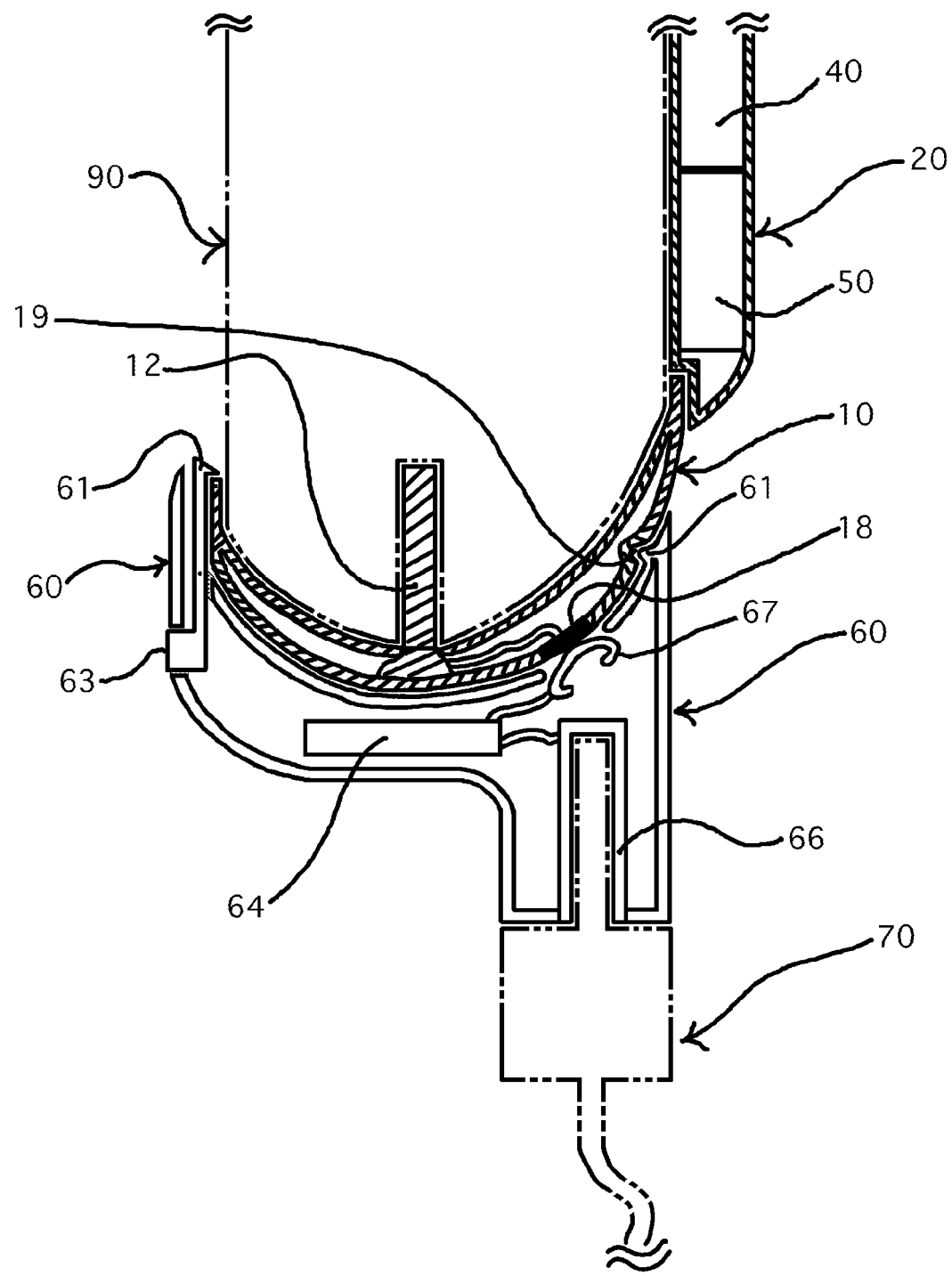
FIG. 14 is a side cross-sectional view of the bottom holding portion engaged in the connector adaptor and the multi-purpose connector connecting the multi-purpose connector receptacle of the connector adaptor according to an embodiment of the present invention.

FIGS. 1, 13 and 14 illustrate that the multi-purpose connector 70 from an external electronic devise may be configured to be connected to the multi-purpose receptacle 66 of the connector adaptor 60.

As shown in FIGS. 15 to 19, the dock 80 may be configured to accept the bottom holding portion 10 even when the case battery 100 is enclosing the personal electronic device 90 and provide access to external electrical power to charge the charging portion 40 and access to information to communicate between the dock 80, the personal electronic device 90 and an external device (not shown).

In certain embodiments as shown in FIGS. 15-20, the dock 80 may include a holding cup 82, a spring connector 84, a plurality of locks 81, a release button 83, a multi-purpose connector receptacle 86, and a charging indicator 88.

The spring connector 84 may be configured to connect the connector receptacle 18 of the bottom holding portion 10 when the bottom holding portion 10 is disposed at the bottom of the holding cup 82.

The spring connector 84 of the dock 80 may be connected to the multi-purpose connector receptacle 86 of the dock 80, which further connects to an external electronic devices via a multi-purpose connector.

Figure 18:
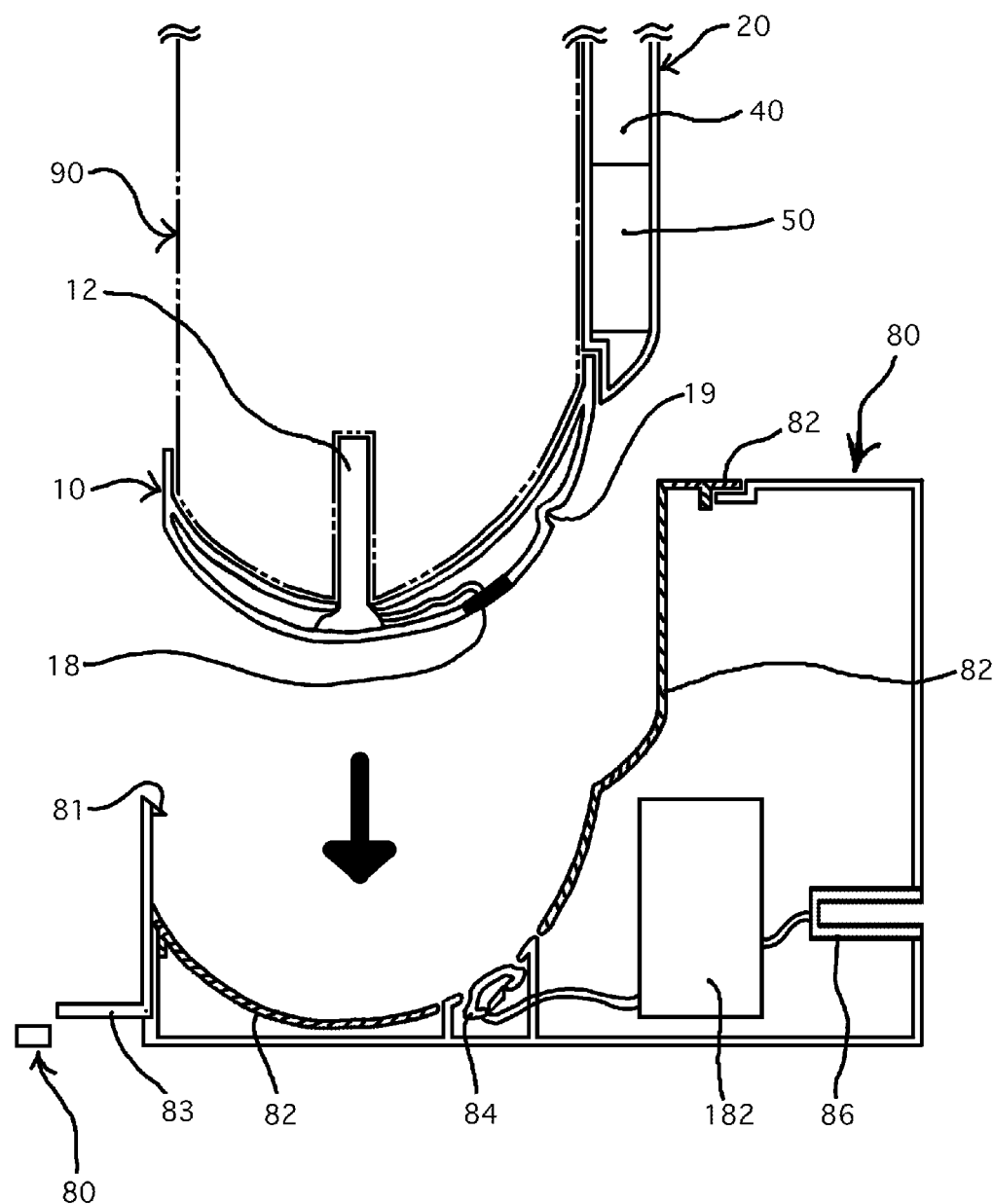
FIG. 18 is a side cross-sectional view of the bottom holding portion and the dock before being installed according to an embodiment of the invention.
Figure 19:
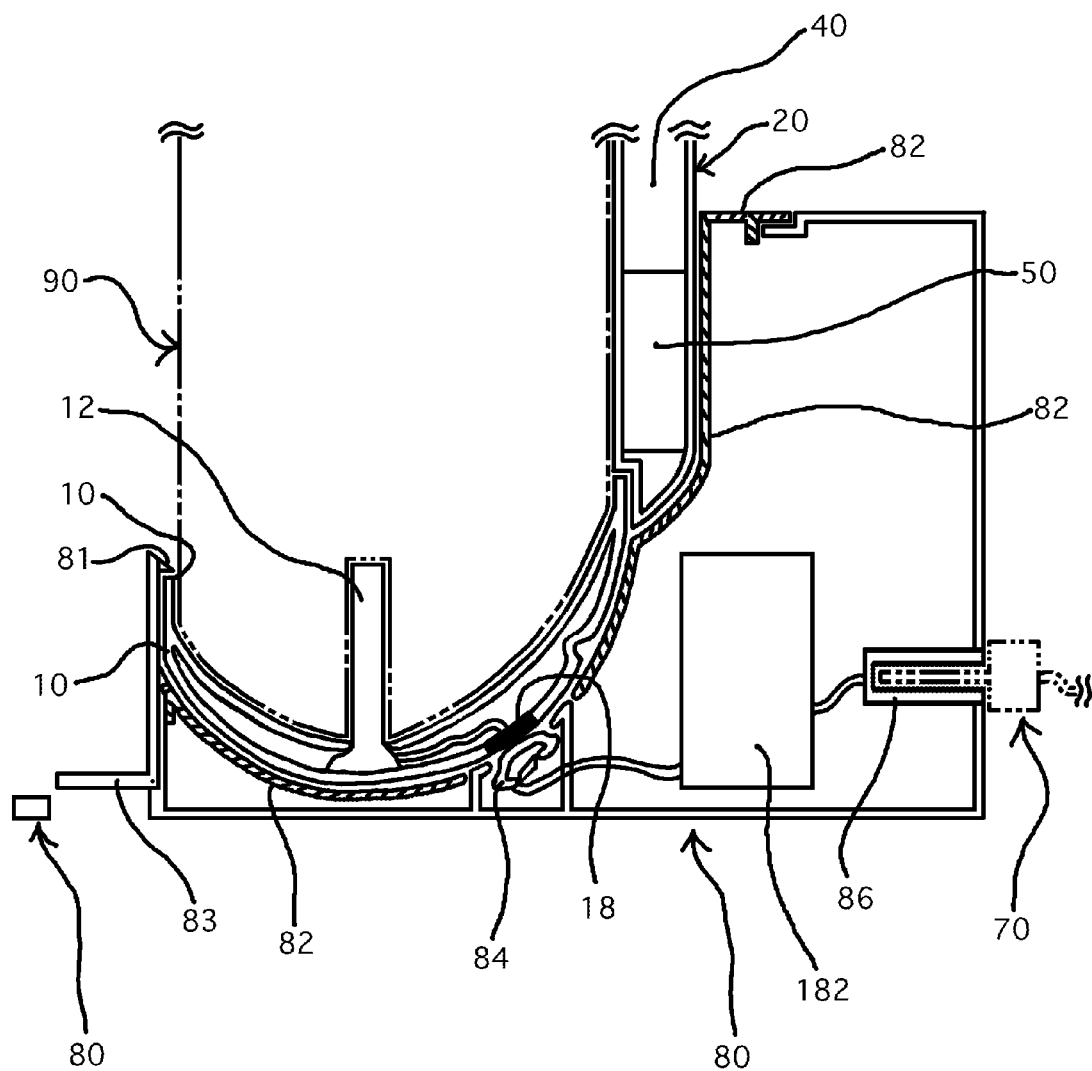
FIG. 19 is a side cross-sectional view of the bottom holding portion when installed on the dock and the multi-purpose connector connecting to the multi-purpose connector receptacle according to an embodiment of the invention.

As shown in FIGS. 18 and 19, the plurality of locks 81 may be configured to lock the bottom holding portion 10 in place.

The release button 83 may be configured to release the bottom holding portion 10 from the plurality of locks 81.

The dock 80 may connect directly to an external device through an electric cable without the multi-purpose connector receptacle 86, and the other end of the cable is the multi-purpose connector, which can be connected to an external electronic device.

Figure 16:
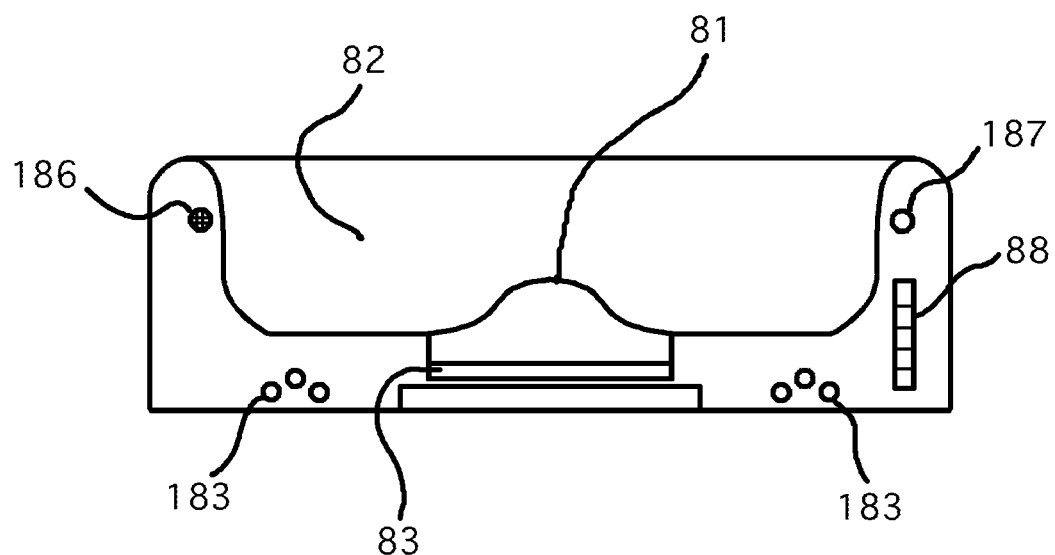
FIG. 16 is a front plan view of the dock according to an embodiment of the invention.
Figure 17:
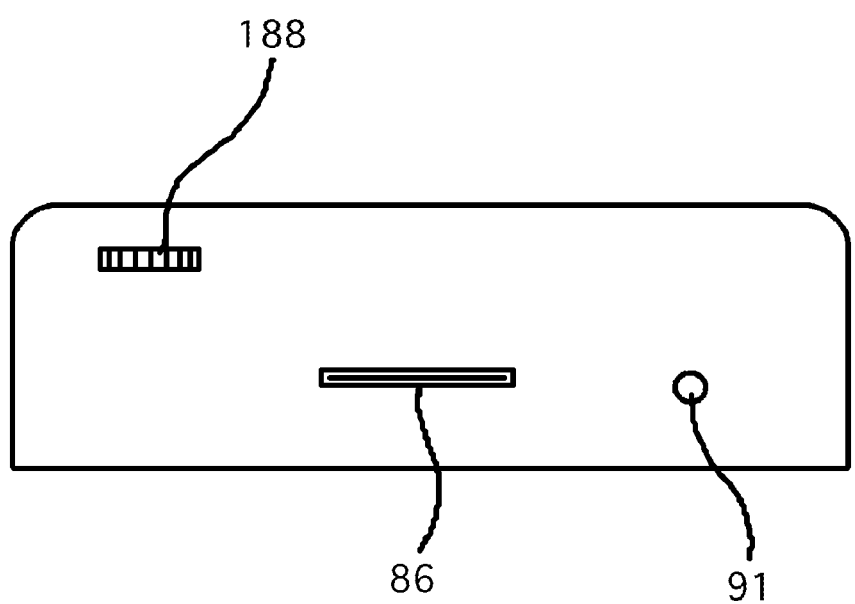
FIG. 17 is a rear plan view of the dock according to an embodiment of the invention.

As shown in FIGS. 16 and 18, the charging indicator 88 may be configured to monitor a charging status of the charging portion 40 and the battery of the personal electronic device 90.

As indicated in FIGS. 15 to 19, the rear plate portion 20 containing the charging portion 40 and the circuit portion 50 may be replaceable, and have a predetermined thickness according to a capacity of the charging portion 40. Then the holding cup 82 may be adjustable according to the various thickness and size of the case battery 100. The holding cup 82 can be seen distinctly from the rest of the dock 80 that is hatched in FIGS. 18 and 19.

Figure 15:
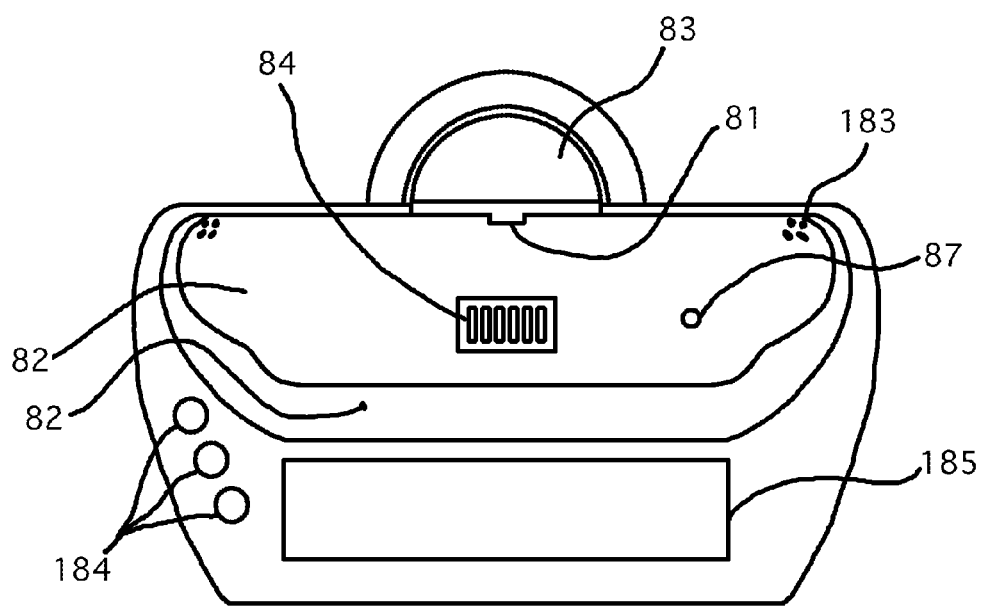
FIG. 15 is a top plan view of the dock according to an embodiment of the invention.

The bottom holding portion 10 may further include case speakers 13 connected to the personal electronic device 90 and a deactivation switch 17 as shown in FIGS. 4, 7, and 15. The dock 80 may further include a bump 87 configured to press the deactivation switch 17 when the bottom holding portion 10 is installed on the dock 80 so as to deactivate the case speaker 13. In certain embodiments, the bump 87 can be retracted even when the bottom holding portion 10 is installed on the dock 80.

In certain embodiments of the invention as shown in FIGS. 15 to 20, this can be performed by pressing a deactivation off switch 85 provided in the dock 80. In the illustrated embodiment, the dock may further comprise a speaker 89, a plurality of controllers 184 configured to control the behaviors of the dock 80. In such embodiments, the dock 80 may further comprise a display panel 185 configured to display information from the case battery 100 or the dock 80, a microphone 186, an optical sensor 187 for a remote (not shown), a volume control 188, and a line out connector receptacle 91 which may be configured to connect to other electronic devices. The dock 80 may still further comprise AM/FM radio, antenna, and various sound controlling devices such as equalizer, frequency control, and bass booster (not shown), the behaviors of which can be controlled by a plurality of controllers 184. Also, the dock 80 may comprise fourth circuit portion 182 controlling the behavior of the dock 80 and communication between other components of the case battery system, a personal electronic device 90 and an external electronic device.

As shown in FIGS. 13 and 14, the connector adaptor 60 may comprise a plurality of locks 61 configured to lock the connector adapter 60 to the bottom holding portion 10, a release button 63 configured to release the connector adaptor 60 from the bottom holding portion 10, and a multi-purpose receptacle 66.

As shown in FIGS. 1 and 4, the connector adaptor 60 may include a charging status indicator 62 of the charging portion 40 and the battery of the electronic device 90. The connector adaptor 60 also includes the third circuit portion 64 controlling the behavior of the connector adaptor 60 and communications between the other component of the case battery, a personal electronic device 90 and an external electronic device.

The connector adaptor 60 may connect directly to the external device through an electric cable without the multi-purpose connector receptacle 66, and the other end of the cable is the multi-purpose connector, which can be connected to an external electronic device.

As shown schematically in FIGS. 13 and 14, the connector adaptor 60 is configured to be connected to the bottom holding portion 10 by holding the lower part of the bottom holding portion 10 from below as if biting into it using the plurality of locks 61 as teeth in a sense. The connector adaptor 60 can be seen distinctly from the bottom holding portion 10 and the rear plate portion 20 that is hatched in FIG. 14.

Figure 20:
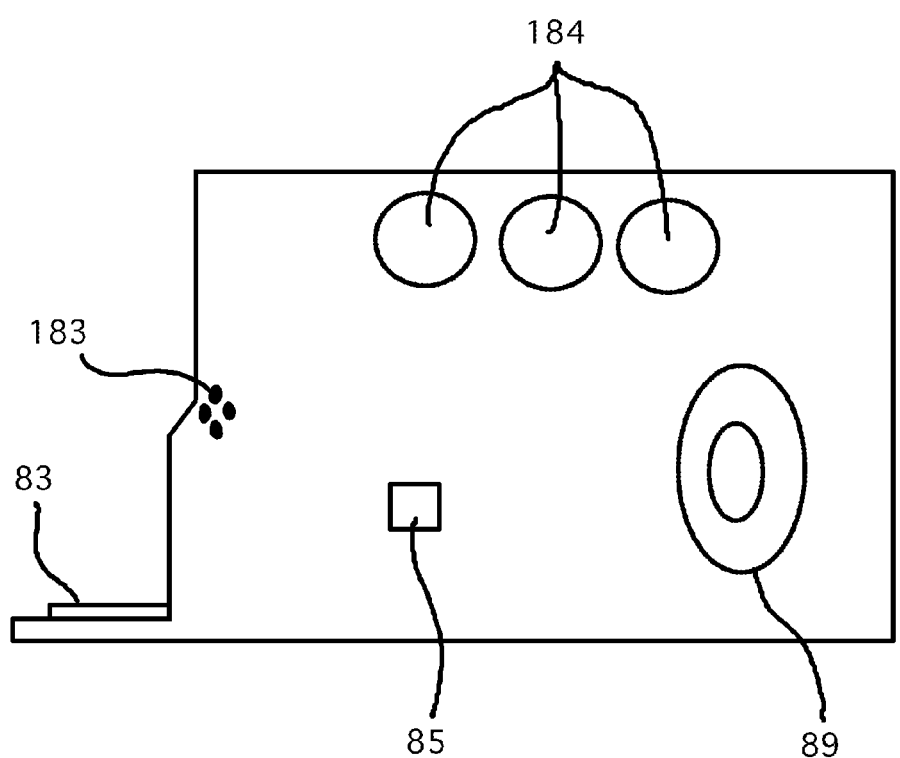
FIG. 20 is a side plan view of the dock according to another embodiment of the invention.

In certain embodiments as shown in FIGS. 16 and 20, the dock 80 may further comprise a plurality of holes 183 for sound from the dock speaker 89, the case speaker 13, or the speakers of the personal electronic device 90.

The personal electronic device may comprise a portable game machine, a cellular phone, a PDA, a palmtop, a MP3 player, a camcorder, a digital camera or a GPS.

In certain embodiments of the invention, the rear plat portion 20 and the bottom holding portion 10 can be integrated into one body. They may be made monolithically by injection molding.

While the invention has been shown and described with reference to different embodiments thereof, it will be appreciated by those skilled in the art that variations in form, detail, composition and operation may be made without departing from the spirit and scope of the invention as defined by the accompanying claims.

DRAWING NUMBER LIST

10: bottom holding portion
11: first mechanical fastener
12: first connector
13: case battery speaker
14: holes of the bottom holding portion 20
15: guide recess
16: resonance chambers
17: deactivation switch
18: connector receptacle plates
19: locking recess
20: rear plate portion
21: second mechanical fastener
23: fourth mechanical fastener 24: electrical connector
25: electrical connector
26: longitudinal rail
27: longitudinal rail recess
30: top holding portion
31: third mechanical fastener
32: holes of the top holding portion 30
40: charging portion
50: first circuit portion
52: second circuit portion
60: connector adaptor
61: locks of the connector adaptor 60
62: charging status indicator of the connector adaptor 60
63: lock release button of the connector adaptor 60
64: third circuit portion of the connector adaptor 60
66: multi-purpose connector receptacle
67: spring connectors of the connector adaptor 60
70: multipurpose connector
80: dock
81: locks of the dock 80
82: holding cup
83: lock release button of the dock 80
84: spring connectors of the dock 80
85: deactivation off switch
86: multi-purpose connector receptacle
87: bump
88: charging status indicator of the dock 80
89: speakers of the dock 80
90: personal electronic device
91: line out connector receptacle
100: case battery
182: fourth circuit portion of the dock 80
183: holes of the dock 80
184: controllers
185: display panel
186: microphone
187: optical sensor
188: volume control

What is claimed is:

1. A case battery system for a personal electronic device, comprising:
  a case battery configured to enclose the personal electronic device, wherein the case battery comprising:
    a bottom holding portion configured to hold a lower part of the personal electronic device and provide a plurality of external interfacing devices with access to the personal electronic device;
    a rear plate portion configured to be attached to and detached from the bottom holding portion mechanically and electrically and protects a rear portion of the personal electronic device;
    a top holding portion configured to hold a top part and partial lateral parts of the personal electronic device and provide access holes to at least part of input and output devices of the personal electronic device;
    a charging portion disposed in the rear plate portion, the charging portion being configured to be electrically connected to the personal electronic device while the personal electronic device is installed in the case battery; and
    a plurality of circuit portions disposed in the rear plate portion, wherein at least one of the plurality of circuit portions is configured to connect the charging portion to the personal electronic device;
  a connector adaptor configured to attach to the bottom holding portion of the case battery; and
  a dock configured to accept the bottom portion of the case battery.

2. The case battery system of claim 1, wherein the connector adaptor is configured to charge the personal electronic device from an external electrical power and to communicate with the personal electronic device, the case battery system, and an external electronic device.

3. The case battery system of claim 1, wherein the dock is configured to charge the personal electronic device from an external electrical power and communicate with the personal electronic device, the case battery system, and an external electronic device.

4. The case battery system of claim 1, wherein the bottom holding portion of the case battery comprises:
  a first connector configured to electrically connect the case battery to the personal electronic device, wherein the first connector comprises a power connector and a electrical signal connector;
  a plurality of holes configured to pass sound from the speakers of the personal electrical device, wherein the holes are disposed on a front side, a bottom side or a corner between the front and rear sides of the bottom holding portion; and
  a plurality of resonance chambers provided between the speaker and the plurality of holes, wherein the resonance chambers are configured for the sound from the speaker to resonate so as to be amplified acoustically.

5. The case battery system of claim 4, wherein the bottom holding portion of the case battery engages with side edges of the personal electronic device and exposes the display screen of the personal electronic device.

6. The case battery system of claim 4, the top holding portion, the rear plate portion and the bottom holding portion of the case battery may be connected together or separated from each other by longitudinal rails of the top holding portion and the bottom holding portion engaging or disengaging longitudinal rail recesses of the rear plate portion.

7. The case battery system of claim 1, wherein the charging portion of the case battery further comprises:
  a secondary battery configured to be charged using an external electrical power source; and
  a primary battery and a receptacle configured to accept the primary battery.

8. The case battery system of claim 1, wherein the plurality of circuit portions of the case battery are configured to control behaviors of the charging portion, speakers and communication between other components of the case battery system, a personal electronic device and a external electronic device.

9. The case battery system of claim 1, wherein the connector adaptor is configured to be attached to or detached from the bottom holding portion, wherein the connector adaptor comprises a plurality of locks configured to lock the connector adapter to the bottom holding portion, a plurality of release buttons configured to release the connector adaptor and a multi-purpose receptacle from the bottom holding portion, wherein the multi-purpose receptacle of the connector adaptor is configured to accept a multi-purpose connector from an external device, and wherein at least one of the plurality of circuit portions is configured to control the behavior of the connector adaptor and communications between a personal electronic device, the case battery system, and an external electronic device.

10. The case battery system of claim 1, wherein the dock comprises:
  a holding cup configured to accept and engage at least part of the bottom holding portion;

spring connectors configured to connect the connector receptacle plates of the bottom holding portion when the bottom holding portion is disposed at a bottom of the holding cup;

a plurality of locks configured to lock the bottom holding portion in place;

a release button configured to release the bottom holding portion from the plurality of locks;

spring connectors and a multi-purpose connectors configured to electrically connect the first connector to an external device;

a connector receptacle configured to accept the external device;

a charging status indicator configured to monitor the charging status of the charging portion and the battery of the personal electronic device; and a circuit portion configured to control the behavior of the connector adaptor and communication between other components of the case battery system, the personal electronic device and an external electronic device.

11. The case battery system of claim 10, wherein the rear plate portion of the case battery is replaceable, wherein the rear plate portion has a predetermined thickness according to the capacity of the charging portion, wherein the holding cup is adjustable according to the thickness of the rear plate portion, and wherein the rear plate portion is replaceable by a regular plate without the charging portion and the first circuit portion.

12. The case battery system of claim 11, wherein the bottom holding portion of the case battery further comprises case battery speakers connected to a personal electronic device and an deactivation switch, wherein the dock further comprises a bump configured to press the deactivation switch when the bottom holding portion is installed on the dock so as to deactivate the case battery speakers.

13. The case battery system of claim 1, wherein the top holding portion comprises a third mechanical fastener, wherein the rear plate portion comprises a fourth mechanical fastener corresponding to the third mechanical fastener, and wherein the top holding portion and the rear plate portion are attached and locked to each other by the third and fourth mechanical fasteners.

14. The case battery system of claim 1, Wherein the bottom holding portion of the case battery further comprises a first mechanical fastener, wherein the rear plate portion comprises a second mechanical fastener corresponding to the first mechanical fastener, and wherein the bottom holding portion and the rear plate portion are attached and locked to each other by the first and second mechanical fastener.

15. The case battery system of claim 1, further comprising a connector adaptor configured to be attached to or detached from the bottom holding portion, wherein the connector adaptor comprises a plurality of locks configured to lock the connector adapter to the bottom holding portion, a release button configured to release the connector adaptor from the bottom holding portion, and a multi-purpose receptacle, and wherein the bottom holding portion further comprises a guide recess at a lower part such that the connector adapter is guided to be connected to the bottom holding portion.

16. The case battery system of claim 15, wherein the connector adaptor comprises a charging status indicator and circuit portion, wherein the charging status indicator is configured to monitor the charging status of the charging portion and the battery of the personal electronic device, and wherein the circuit portion is configured to control the behavior of the connector adaptor and communication between other components of the case battery system, the personal electronic device and an external electronic device.

* * * * *